(12) United States Patent
Zhang et al.

(10) Patent No.: US 10,974,727 B2
(45) Date of Patent: Apr. 13, 2021

(54) TRANSPORTATION INFRASTRUCTURE COMMUNICATION AND CONTROL

(71) Applicant: Ford Global Technologies, LLC, Dearborn, MI (US)

(72) Inventors: Linjun Zhang, Canton, MI (US); Helen Elizabeth Kourous-Harrigan, Monroe, MI (US); Ankit Girish Vora, Dearborn, MI (US); Codrin Cionca, Ann Arbor, MI (US); Lu Xu, Dearborn, MI (US); Jeffrey Thomas Remillard, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 257 days.

(21) Appl. No.: 16/018,144

(22) Filed: Jun. 26, 2018

(65) Prior Publication Data
US 2019/0389472 A1 Dec. 26, 2019

(51) Int. Cl.
*B60W 40/06* (2012.01)
*H04W 4/44* (2018.01)
*G08G 1/01* (2006.01)
*G01B 11/30* (2006.01)

(52) U.S. Cl.
CPC .......... *B60W 40/06* (2013.01); *G01B 11/303* (2013.01); *G08G 1/0112* (2013.01); *G08G 1/0116* (2013.01); *H04W 4/44* (2018.02); *B60W 2420/42* (2013.01); *B60W 2420/52* (2013.01); *B60W 2510/18* (2013.01); *B60W 2510/22* (2013.01); *B60W 2756/10* (2020.02); *G01B 2210/58* (2013.01)

(58) Field of Classification Search
CPC ............ B60W 40/06; B60W 2510/18; B60W 2420/52; B60W 2420/42; H04W 4/44; G08G 1/0112; G08G 1/0116; G01B 11/303; G01B 2210/58
See application file for complete search history.

(56) References Cited

U.S. PATENT DOCUMENTS

| | | |
|---|---|---|
| 6,950,789 B2 | 9/2005 | Laird et al. |
| 8,520,695 B1 | 8/2013 | Rubin et al. |
| 9,092,981 B2 | 7/2015 | Suzuki et al. |
| 10,373,490 B2 | 8/2019 | Lee et al. |
| 10,634,782 B2 | 4/2020 | Kawanishi et al. |
| 2002/0105423 A1 | 8/2002 | Rast |
| 2004/0233048 A1 | 11/2004 | Luna et al. |

(Continued)

FOREIGN PATENT DOCUMENTS

| | | |
|---|---|---|
| CA | 2290032 A1 | 5/2001 |
| CN | 101783072 A | 7/2010 |

(Continued)

OTHER PUBLICATIONS

Non-Final Office Action dated Apr. 29, 2020 re U.S. Appl. No. 16/018,145, filed Jun. 26, 2018.

(Continued)

*Primary Examiner* — Manuel A Rivera Vargas
(74) *Attorney, Agent, or Firm* — Frank A. MacKenzie; Bejin Bieneman PLC

(57) ABSTRACT

Data is received from a vehicle in a stationary support structure. One or more physical attributes of an infrastructure element is determined based on the vehicle data.

22 Claims, 4 Drawing Sheets

(56) References Cited

U.S. PATENT DOCUMENTS

| | | |
|---|---|---|
| 2005/0257748 A1 | 11/2005 | Kriesel et al. |
| 2012/0139755 A1 | 6/2012 | Ginsberg |
| 2012/0200431 A1 | 8/2012 | Ross |
| 2015/0161540 A1 | 6/2015 | Akselrod et al. |
| 2017/0113664 A1* | 4/2017 | Nix .................... B60T 8/17558 |
| 2017/0243485 A1 | 8/2017 | Rubin et al. |
| 2017/0251541 A1* | 8/2017 | Cavalcanti ............. G06Q 30/04 |
| 2017/0287332 A1 | 10/2017 | Ranninger Hernandez et al. |
| 2018/0075309 A1 | 3/2018 | Sathyanarayana et al. |
| 2018/0217603 A1 | 8/2018 | Kwon et al. |
| 2019/0047581 A1 | 2/2019 | Bai et al. |

FOREIGN PATENT DOCUMENTS

| | | |
|---|---|---|
| CN | 102176284 B | 4/2014 |
| CN | 203825818 U | 9/2014 |
| JP | 2014182433 A | 9/2014 |
| KR | 101145896 B1 | 5/2012 |
| KR | 101671428 B1 | 11/2016 |
| KR | 101678004 A | 11/2016 |
| KR | 101747233 B1 | 6/2017 |

OTHER PUBLICATIONS

Axxonsoft, Integrated Security Solutions—License Plate Recognition, http://www.axxonsoft.com/inegrated_security_solutions/.

Final Office Action dated Nov. 12, 2020; U.S. Appl. No. 16/018,145, filed Jun. 26, 2018.

Notice of Allowance dated Jan. 28, 2021 re U.S. Appl. No. 16/018,145, filed Jun. 26, 2018.

* cited by examiner

US 10,974,727 B2

TRANSPORTATION INFRASTRUCTURE COMMUNICATION AND CONTROL

BACKGROUND

Control of road traffic and/or reaction to events such as infrastructure issues (e.g., a defective bridge), accidents, natural disasters, etc. may depend on information about such conditions. For example, an emergency response center computer may receive sensor data from cameras or other types of sensors mounted to the infrastructure, e.g., mounted at intersections, bridges, tunnels, etc. As another example, agents such as police officers, fire fighters, etc. may provide input to a center based on their observation of problem. However, technology to provide communications about such events or infrastructure defects may be unavailable or lack robustness. For example, existing vehicle-to-infrastructure communication systems, which may be configured to provide such data, can fail due to failures of sensors mounted to infrastructure elements, e.g., due to power failures, defective parts, etc., fatigue, etc.

DETAILED DESCRIPTION

Introduction

Figure 1:
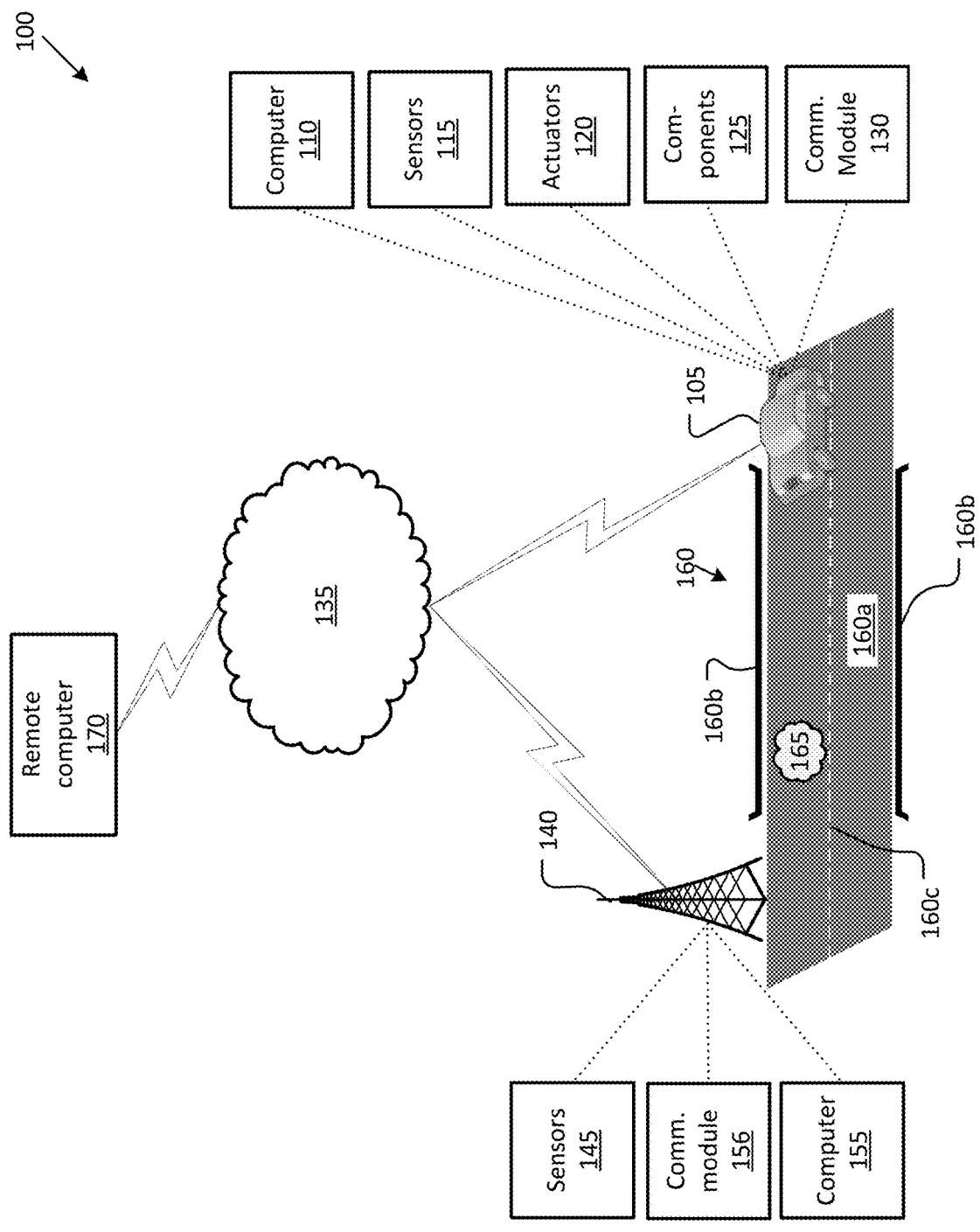
FIG. 1 is a diagram illustrating an example infrastructure communications and control system.

Disclosed herein is a system, comprising a stationary support structure; and sensors and a computer, each mounted to the support structure; wherein the computer is programmed to receive data from a vehicle, and to determine one or more physical attributes of an infrastructure element based on the vehicle data.

The system can include that the vehicle data includes at least one of vehicle suspension displacement, vehicle anti-lock brake system activation, and vehicle electronic stability control activation.

The system can include that the vehicle data includes the one or more physical attributes of the infrastructure element.

The system can include that the vehicle data includes the one or more physical attributes of the infrastructure element, and the computer is further programmed to compare data from the sensors with the vehicle data to determine one or more physical attributes of the infrastructure element based on the vehicle data.

The system can include that the vehicle data includes the one or more physical attributes of the infrastructure element, and the computer is further programmed to determine a health of the sensors based on the vehicle data.

The system can include that the computer is further programmed to transmit the health of the sensors to a remote computer.

The system can include that the one or more physical attributes of the infrastructure element include at least one of a pothole, a crack, and a bump.

The system can include that the one or more physical attributes of an infrastructure element include a specification that the infrastructure element is one of normal, degraded, and damaged.

The system can include that the sensors include a LIDAR and a camera.

A method, comprises receiving, in a stationary support structure, data from a vehicle; and determining one or more physical attributes of an infrastructure element based on the vehicle data.

The method can include that the vehicle data includes at least one of vehicle suspension displacement, vehicle anti-lock brake system activation, and vehicle electronic stability control activation.

The method can include that the vehicle data includes the one or more physical attributes of the infrastructure element.

The method can include that the vehicle data includes the one or more physical attributes of the infrastructure element, the method further comprising comparing data from infrastructure sensors with the vehicle data to determine one or more physical attributes of the infrastructure element based on the vehicle data.

The method can include that the vehicle data includes the one or more physical attributes of the infrastructure element, the method further comprising determining a health of the sensors based on the vehicle data.

The method can further comprise transmitting a health of the sensors to a remote computer.

The method can include that the one or more physical attributes of the infrastructure element include at least one of a pothole, a crack, and a bump.

The method can include that the one or more physical attributes of an infrastructure element include a specification that the infrastructure element is one of normal, degraded, and damaged.

The method can include that the infrastructure element includes sensors that include a LIDAR and a camera.

Exemplary System Elements

A stationary support structure can support various components, such as sensors and a computer, mounted thereto (e.g., with various mounting mechanisms, housings, etc.). The computer can be programmed to receive data from a vehicle proximate to the support structure. Based on the received data, the computer can determine one or more physical attributes of an infrastructure element near the support structure. For example, an infrastructure element can be a road, a bridge, a sidewalk, or the like. By determining one or more physical attributes of an infrastructure element, the computer can further compare its determination to a determination provided by one or more vehicles to evaluate health and/or accuracy of the sensors mounted to the support structure. Further, data from a vehicle can include vehicle state data, e.g., a state or state of a suspension, an anti-lock brake system (ABS), and/or an electronic stability control (ESC) system, that can be used by the computer mounted to the stationary support structure to determine the one or more physical attributes of the infrastructure element.

FIG. 1 is a block diagram of an example infrastructure communications and control system (or infrastructure system) 100. The system 100 includes a vehicle 105, which is a land vehicle such as a car, truck, etc. Additionally or alternatively, the vehicle 105 may include a bicycle, a motorcycle, etc. The vehicle 105 includes a vehicle computer 110, sensors 115, actuators 120 to actuate various vehicle components 125, and a vehicle communications module 130. Via a network 135, the communications module 130 allows the vehicle computer 110 to communicate with one or more data collection or infrastructure nodes 140 and a central server 170.

The computer 110 includes a processor and a memory such as are known. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 105 communications bus as described further below, more than one processor, e.g., included in electronic controller units (ECUs) or the like included in the vehicle for monitoring and/or controlling various vehicle components 125, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 105 network, the computer 110 may transmit messages to various devices in the vehicle and/or receive messages from the various devices, e.g., sensors 115, an actuator 120, an human machine interface (HMI), etc. Alternatively or additionally, in cases where the computer 110 actually comprises a plurality of devices, the vehicle 105 communication network may be used for communications between devices represented as the computer 110 in this disclosure. Further, as mentioned below, various controllers and/or sensors 115 may provide data to the computer 110 via the vehicle communication network.

Vehicle 105 sensors 115 may include a variety of devices such as are known to provide data to the computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 105, etc., relative to the location of the vehicle 105. The sensors 115 may further alternatively or additionally, for example, include camera sensor(s) 115, e.g. front view, side view, etc., providing images from an area surrounding the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 101, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through wireless vehicular communication (e.g., vehicle-to-vehicle (V2V) communication, vehicle-to-infrastructure (V2I or V2X) communication, vehicle-to-cloud (V2C) communication, etc.), to an infrastructure node 140 (typically via direct radio frequency communications) and/or (typically via the network 135) a remote (i.e., external to the vehicle 105 and in a geographic location out of a line of sight of the vehicle 105 and node 140) server 170. The module 130 could include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with an infrastructure node 140 and/or central server 170. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

An infrastructure node 140 includes a physical structure such as a tower or other support structure (e.g., a pole, a box mountable to a bridge support, cell phone tower, road sign support, etc.) on which infrastructure sensors 145, as well as an infrastructure communications module 156 and computer 155 can be mounted, stored, and/or contained, and powered, etc. One infrastructure node 140 is shown in FIG. 1 for ease of illustration, but the system 100 could and likely would include tens, hundreds, or thousands of nodes 140. The infrastructure node 140 is typically stationary, i.e., fixed to and not able to move from a specific geographic location.

The infrastructure sensors 145 may include one or more sensors such as described above for the vehicle 105 sensors 115, e.g., LIDAR, radar, cameras, ultrasonic sensors, etc. The communications module 156 and computer 155 typically have features in common with the vehicle computer 110 and vehicle communications module 130, and therefore will not be described further to avoid redundancy. Although not shown for ease of illustration, the infrastructure node 140 also includes a power source such as a battery, solar power cells, and/or a connection to a power grid.

An infrastructure node 140 can be provided to monitor one or more infrastructure elements 160. An infrastructure element 160 (sometimes also referred to herein as an object 160), in the present context, is a physical structure provided to facilitate pedestrian and/or ground vehicle transportation. For example, an infrastructure element 160 may be a bridge, a tunnel, road surface, etc. The node 140 can monitor physical features 165 of infrastructure elements 160. Physical feature 165 is a physical attribute or characteristic of infrastructure element 160, such as a topography of a surface area (e.g., is it bumpy or smooth, potholed, etc.), a material covering the infrastructure element 160, e.g., asphalt or gravel, or a state of damage such as flooding or debris from an avalanche or rock slide. Alternatively or additionally, a physical feature 165 could be a physical attribute or characteristic of an infrastructure element or object 160 specifying a condition or classification of the infrastructure element 160, such as normal, degraded, or damaged.

The server 170 can be a conventional computing device, i.e., including one or more processors and one or more memories, programmed to provide operations such as disclosed herein. Further, the server 170 can be accessed via the network 135, e.g., the Internet or some other wide area network.

Figure 2:
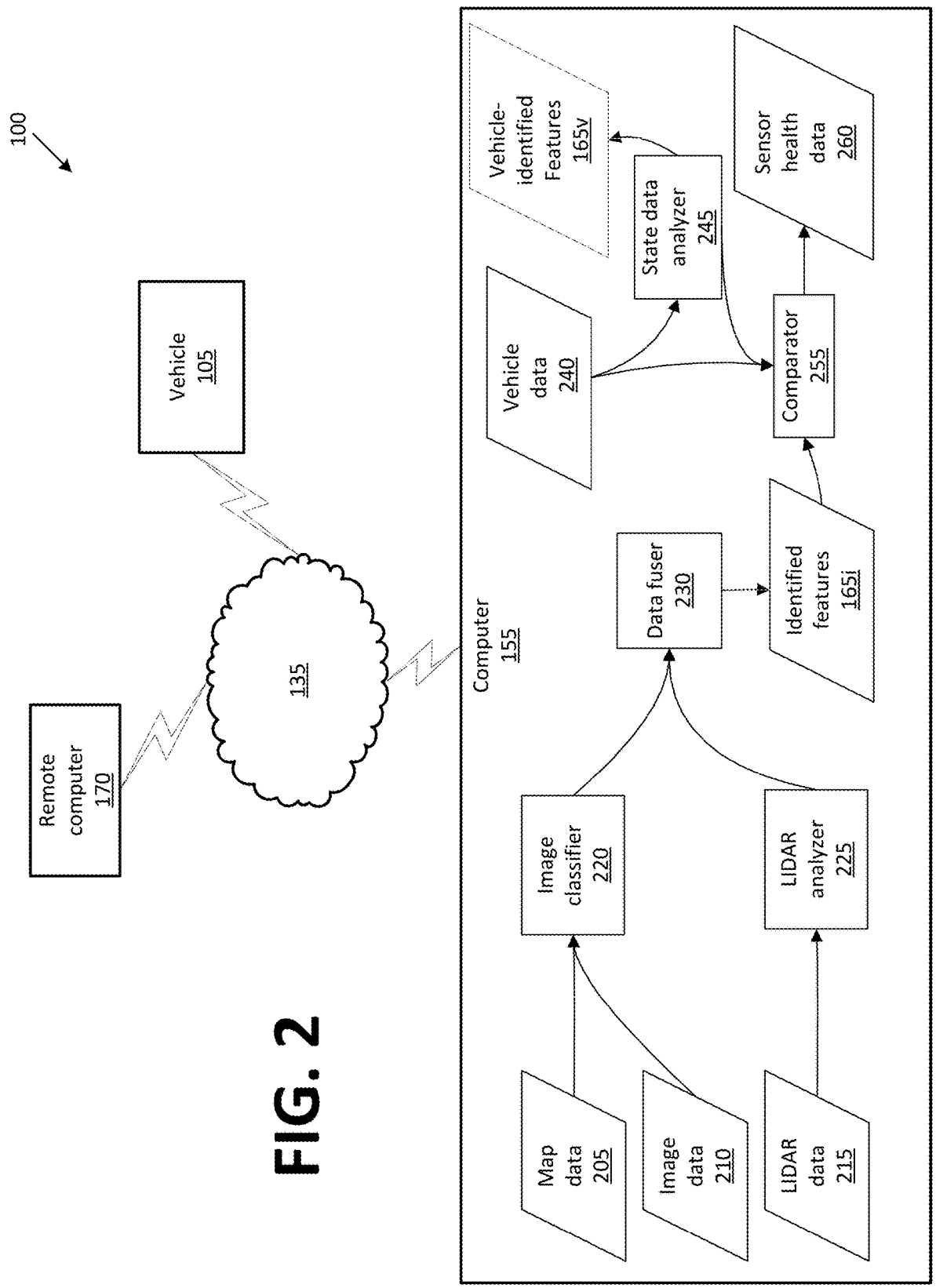
FIG. 2 is a block diagram illustrating processing in an infrastructure node computer.

FIG. 2 is a block diagram illustrating processing in an infrastructure node computer 155.

An infrastructure node 140 computer 155 can include a memory or other storage with map data 205 describing an area (e.g., within a predetermined radius such as 100 meters, 200 meters, etc.) around the node 140. For example, such map data 205 could be received and/or periodically updated from a central server 170, by a technician servicing the node 140, etc. Map data 205 typically includes geo-coordinates defining infrastructure elements 160 and/or features 165.

Further, the computer 155 can receive various data from the node 140 sensors 145 as well as, e.g., via V2X communications, from vehicle 105 sensors 115. Image data 210 is digital image data, e.g., comprising pixels with intensity and color values, can be acquired by a camera sensors 115, 145. LIDAR data 215 typically includes conventional LIDAR point cloud data acquired by LIDAR sensors 115, 145, i.e., including data describing points in three dimensions, that is, each point representing a location of a surface of an object.

Map data 205 and image data 210 can be provided to a classifier 220. The classifier 220 comprises programming to utilize one or more conventional image classification techniques. Typically, the classifier 220 comprises neural network programming. For example, the classifier can use a machine learning technique in which images 210 of objects 160 can be provided to a machine learning program for training the classifier 220. Training images 210 can be provided from a plurality of nodes 140, from images gathered by vehicles 105, or other sources. Once trained, the classifier 220 can accept as input an image 210 and then provide as output, for each of one or more respective regions of interest in the image 210, an indication of one or more objects 160 present in the respective region of interest.

Further, the classifier 220 typically provides, for each indicated object 160, a confidence estimate, e.g., on a scale of 0 to 1, or 0 to 100%, etc., of classification classifications indicated for an object. For example, the classifier 220 could identify an object, and further output for the object a 95% confidence that the object is a cat, a 4% confidence that the object is a dog, and a 1% confidence that the object is a cow.

Map data 205 is localized, i.e., selected according to a location of an infrastructure node 140, and used to specify geo-coordinates for physical features 165, which in turn can be used to determine the region of interest in an image 210. For example, map data 205 may specify geo-coordinates or the like for various physical features 165 that can be in a field of view of a camera sensor 145 mounted or attached to the node 140. Programming of the classifier 220 or otherwise included in the computer 155 can determine a region of interest in an image 210 according to geo-coordinates specified in map data 205. That is, geo-coordinates in map data 205 can be mapped or associated to Cartesian or polar coordinates in an image sensor 145 field-of-view. The classifier 220 can identify coordinates in an image 210 representing a region of interest based on geo-coordinates in map data 205 related to a physical feature 165, e.g., a support for a bridge, a guardrail for a road, a road surface, etc. The region of interest can then be analyzed by the classifier 220 according to conventional image classification and/or object recognition techniques. Accordingly, the classifier 220 can output identification of one or more physical features 165, such as a pothole, a crack in a road or bridge, ice on a road, lane markings, etc.

The map data 205 may be provided with such physical feature 165 data when it is created and stored on the server 170, e.g., according to human input. Yet further, map data 205 provided from the server 170 could specify geo-coordinates for a field of view of sensors 145. For example, the map data 205 could indicate geo-coordinates for a camera sensor 145 field-of-view, whereupon known image processing techniques could be used to identify physical features 165, such as cracks in a road or support structure, potholes, etc., even if geo-coordinates or the road including the cracks or potholes, or support structure including cracks, are not provided in the map data 205. Similarly, change detection techniques could be used to monitor a region of interest, whereupon the computer 155 could be programmed to output an indication of possible infrastructure damage upon detecting a change in a physical feature 165.

The LIDAR analyzer 225, like the image classifier 220, typically comprises neural network programming. For example, machine learning can be applied to LIDAR point cloud data 215 to identify objects 160, and to provide confidences of a classification of an object 160, as described above for the classifier 220.

Data fuser 230 comprises further programming in the computer 155. The data fuser includes programming to accept as input a first set of one or more features 165 identified by the image classifier 220 and a second set of one or more features 165 identified by the LIDAR analyzer 225. The data fuser 230 can output a third set of one or more identified features 165$i$. The set of identified features 165$i$ could be provided in the form of a list, a table, or the like, where each feature 165$i$ in the set is identified by an identifier and/or description, e.g., "ice coating," "pothole," "crack," etc., along with a set of geo-coordinates identifying a location or locations of the respective feature 165$i$. For example, the geo-coordinates could specify a center or reference point, e.g., for a pothole, coating of ice, etc., and/or could specify start and end points, vertices of a polygon, etc., identifying a location or locations of the feature 165i.

Identified features 165i can be determined by the following processing by the data fuser 230. Specifically, the data fuser 230 can compare each feature 165 identified in the first set to each feature 165 identified in the second set to determine if a confidence in a feature 165 identified by at least one of image data 210 and LIDAR data 215 warrants a conclusion that the feature 165 can be identified with respect to an infrastructure element 160.

For example, as mentioned above, conventional image classification and LIDAR data analysis techniques may be used in the image classifier 220 and LIDAR analyzer 225, respectively, to assign a confidence level, e.g., a number between or including zero and one, to each predicted feature 165. The computer 155 is typically programmed to accept output of whichever of the image classifier 220 and LIDAR analyzer 225 indicates a highest confidence for an object 160 associated with a same set of geo-coordinates (or with objects 160 at substantially a same set of geo-coordinates, e.g., within 5 centimeters (cm), etc.). When the highest available confidence of a feature 165 prediction of an object 160 from the image classifier 220 and the LIDAR analyzer 225 meets or exceeds a threshold, then the feature 165 may be included in the features 160i output from the data fuser 230. In one example, a feature 165 may be included in the features 160i if either the image classifier 220 or the LIDAR analyzer 225 predict the feature 165 with a confidence above a predetermined threshold, e.g., 0.9 or 90%.

Vehicle data 240 can be received from one or more vehicles 105, e.g., via the network 135 or direct (typically radio frequency) V2X communications. As discussed further below, vehicle data 240 is typically received from many vehicles, e.g., hundreds or thousands, of vehicles 105. Vehicle data 240 is data specifying, for one or more objects 160, one or more features 165 as determined by a vehicle computer 110 from vehicle sensor 115 data. Further, for each object 160 specified in vehicle data 240, the vehicle data 240 can further specify a location, e.g., geo-coordinates, of the object 160 for which one or more features 165 are being specified. For example, a vehicle 105 could provide data 240 specifying, for a bridge support object 160, features 165 including a crack and a pothole.

Vehicle data 240 can alternatively or additionally include data from which one or more physical features, i.e., physical attributes or characteristics of infrastructure elements, can be determined. For example, vehicle data 240 can include vehicle state data 240, e.g., a state or state of a suspension, an anti-lock brake system (ABS) (e.g., whether and/or when activated), and/or an electronic stability control (ESC) system (e.g., whether and/or when activated), as well as a specification of an amount of time, e.g., in milliseconds (ms), that a vehicle 105 was in a given state.

Vehicle state data 240 can be input to a state data analyzer 245, i.e., programming in the computer 155 to identify one or more features 165v (so referenced because they are determined from vehicle 105 data 240) of one or more objects 160 from the data 240. Various states can be used to predict a physical feature 165 of object 160, e.g., a pothole feature 165 in a road object 160a. For example, vehicle 105 suspension data could include information about a vertical displacement of a vehicle 105 suspension over time, or over distance traveled on a road 160a. Programming in the computer 155 could include instruction to indicate a pothole feature 165 at a location on a road 160a upon a determination of a vehicle 105 suspension displacement by more than a predetermined threshold, e.g., 10 cm, 20 cm, etc., at the location, e.g., at a set of geo-coordinates.

Further, the computer 155 would typically include instruction to aggregate state data 240 from many, e.g., hundreds of vehicles, received within a specified period of time, e.g., one hour, 24 hours, etc. For example, suspension displacement data 244 a location, e.g., a set of geo-coordinates, could be averaged to provide an average displacement that could then be correlated to a predicted feature 165, e.g. a pothole feature 165. That is, an average displacement of more than a predetermined amount, e.g., 10 cm, 20 cm, etc. could indicate a pothole feature 165. In another example, an average displacement of less than a first predetermined amount could indicate a normal feature 165 at a location, an average displacement of greater than the first predetermined amount but less than a second predetermined amount could indicate a degraded feature 165 at the location, and an average displacement of greater than the second predetermined amount could indicate a damaged feature 165 at the location. Various vehicle states indicating features 165 could be empirically determined for different makes and models, etc., of vehicles 105. For example, driving a vehicle 105 on a test track with conditions simulating potholes of various adopts could be performed to determine suspension displacements indicating various features 165 four that vehicle 105.

Similarly, activation of an ABS or ESC for more than a predetermined period of time, e.g., 1000 ms (i.e., one second) could indicate an ice or wet surface, i.e., low friction, feature 165 of a road 160a at a specified location, e.g., a set of geo-coordinates. Empirical data similar to that just described could be established for ABS and ESC-based determinations of features 165.

Table 1 below shows a few examples of correlating state data 240 to features 165.

TABLE 1

| State Data | Feature |
| --- | --- |
| Average suspension displacement less than 2 cm | Normal |
| Average suspension displacement less than 7 cm, greater than 2 cm | Degraded |
| Average suspension displacement greater than 7 cm | Damaged (or pothole) |
| ABS activated by less than 5% of vehicles | Normal |
| ABS activated by greater than 5% of vehicles, less than 50% | Degraded |
| ABS activated by greater than 5% of vehicles | Damaged (or slippery) |

Comparator 255 comprises further programming in the computer 155. The comparator 255 includes programming to receive as input vehicle data 240, as well as identified features 165i. Vehicle data 240, in addition or as an alternative to the vehicle 105 state data discussed above, can also, as discussed above, include a set of one or more identified vehicle features 165. That is, as also discussed above, a vehicle 105 may be equipped with a computer 110 to analyze data from the vehicle 105 sensors 115. Accordingly, e.g., using techniques discussed above with respect to the computer 155, the computer 110 can analyze sensor 115 image and/or LIDAR data and can then provide features 165, including geo-coordinates thereof, in vehicle data 240.

The comparator 255 can include programming to compare features 165 in vehicle data 240 to identified features 165i. For example, the comparator 255 can determine a first subset of features 165i that are also listed in the set of features 165 from the vehicle data 240. Alternatively or additionally, the comparator 255 can determine a second subset of features 165*i* that are absent from the set of features 165 from the vehicle data 240. Either of the first or second subsets can have no features 165*i*, some but not all features 165*i* in the set of features 165*i*, or all of the features 165*i* that are in the set of identified features 165*i* output from the data fuser 230.

Figure 4:
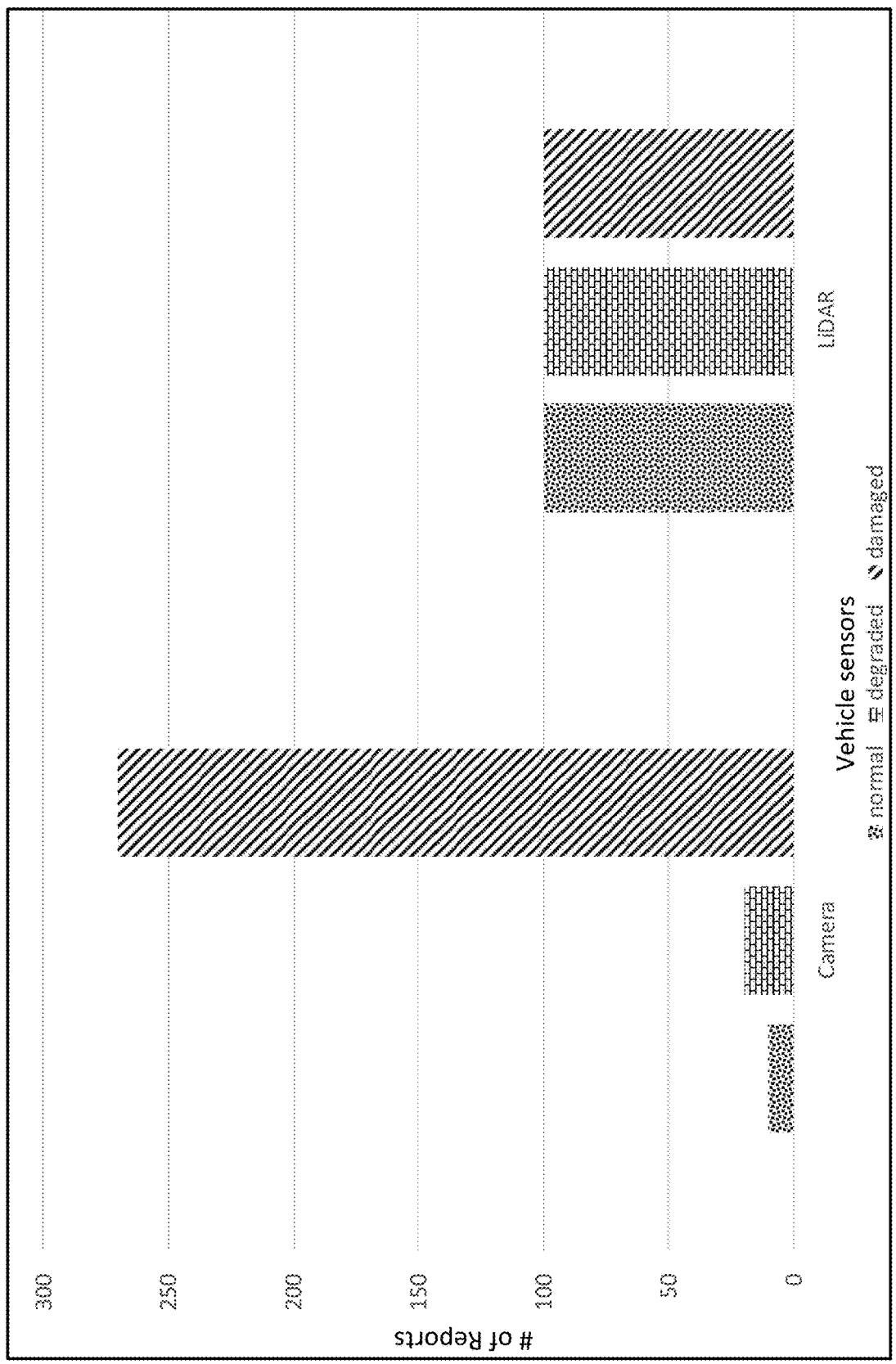
FIG. 4 illustrates an example graph of vehicle data that could have been provided from different vehicles to an infrastructure node computer.

To identify features 165 in vehicle data 240, the comparator 255 typically accepts as input data 240 from many, e.g., hundreds or thousands, of vehicles 105. Further, the comparator 255 typically processes data 240 all received within a specified period of time, e.g., one hour, 24 hours, etc. For example, FIG. 4 illustrates an example graph of vehicle data 240 that could have been provided from 300 different vehicles 105 to a node 140 computer 155. In the example of FIG. 4, the data 240 specifies, or an object 160, whether a normal, degraded, or damaged feature 165 is associated with the object 160. A feature 165 could be deemed "normal" if data 240 indicates that the feature 165 is shown as expected within a specified degree of confidence. Degraded could mean that the feature 165 deviates from an expected normal feature 165 by a certain percentage, e.g., 25%, and damaged could be specified according to a further deviation, e.g., over 50% of a feature 165 could be missing for a feature to be specified as damaged. For example, the object 160 could be a road 160*a*, and the feature 165 could be associated with a surface condition of the road 160*a*. In the example data shown in the graph of FIG. 4, based on camera sensors 115, 90% of 300 vehicles 105 reported a damaged feature 165, 6.7% of the vehicles 105 reported a degraded feature 165, and 3.3% of the vehicles 105 reported a normal feature 165. Further in this example, based on LIDAR sensors 115, 33.3% of the vehicles 105 reported a damaged feature 165, 33.3% of the vehicles 105 reported a degraded feature 165, and 33.3% of the vehicles 105 reported a normal feature 165. The comparator 255 is typically programmed to select a feature 165 reported with a highest confidence. In this case, the uniform distribution of the LIDAR sensor 115 data 240 indicates a low confidence is warranted. Further, the distribution of the camera sensor 115 data is not uniform and the damaged feature 165 has a highest confidence and therefore the damaged feature 165 reported from vehicle 105 camera sensors 115 is output as a feature 165 identified by vehicle data 240.

Then, based on the determined first and/or second subsets of features 165*i*, the comparator 255 can output node 140 sensor 145 health data 260. For example, the comparator 255 can, upon a complete match of the identified features 165*i* output from the data fuser 230, and features 165 for one or more objects 160 determined according to vehicle data 240, output an indication of "no defects" or "total health" with respect to node 140 sensors 145. However, if vehicle data 240 indicates one or more features 165 not included in the identified features 165*i*, then the comparator 255 may output an indication of "possible defects" or "compromised sensor health," etc. The comparator 255 may be programmed to permit some discrepancy between features 165*i* detected from node 140 sensor 145 data and features 165 included in vehicle data 240. For example, if the comparator 255 identifies that vehicle data 240 includes six features 165, but identified features 165*i* from node 140 sensor 145 data number only five, the comparator 255 could nonetheless be programmed to output an indication of likely sensor 145 health.

Yet further additionally or alternatively, the comparator 255 could be programmed to output a list of features 165 included in vehicle data 240 but omitted from node 140 identified features 165*i*, and/or vice versa.

Figure 3:
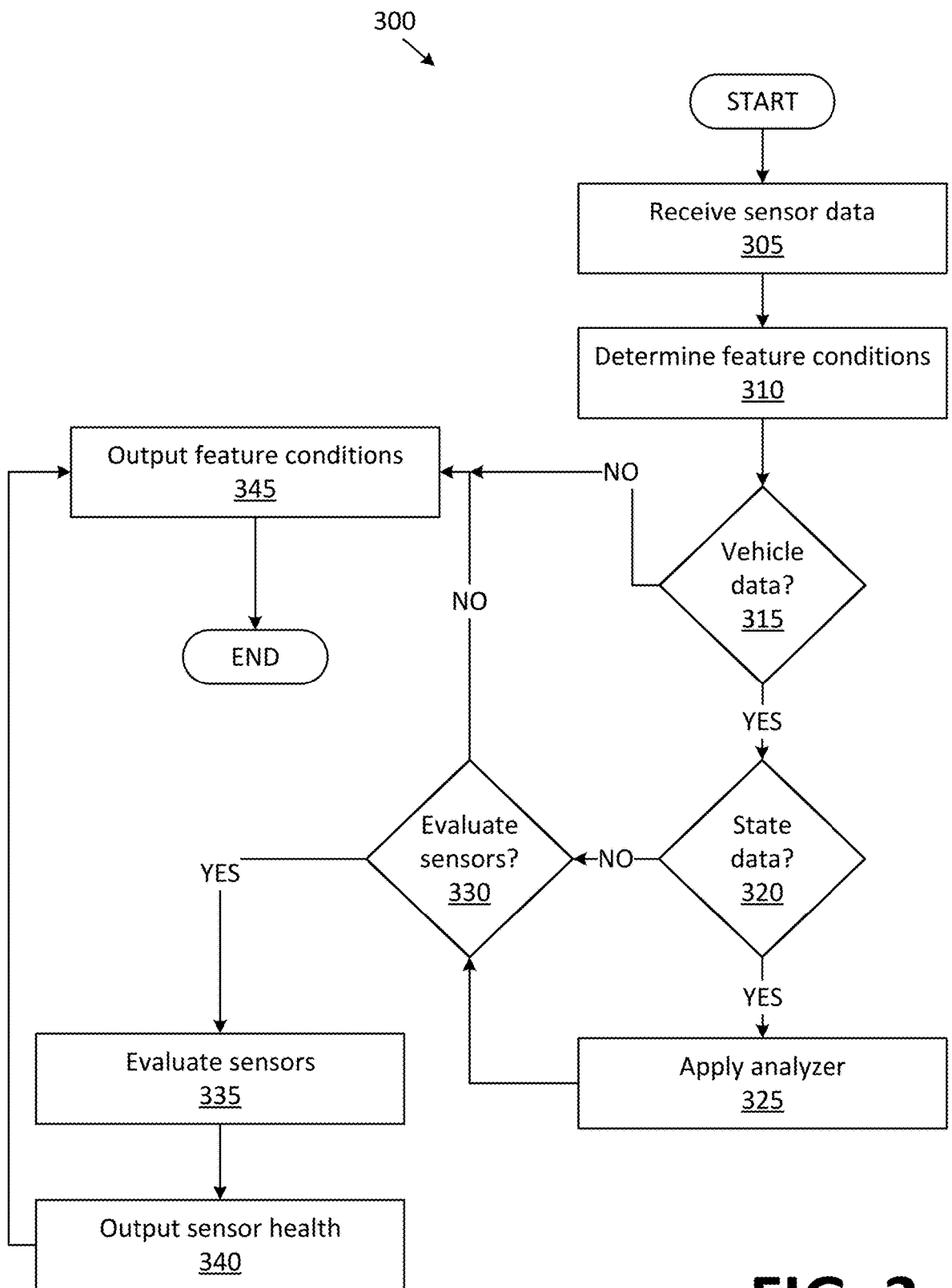
FIG. 3 is a flowchart of an exemplary process for processing an infrastructure node's sensor data.

FIG. 3 is a flowchart of an exemplary process 300 for processing infrastructure node 140 sensor 145 data. The process 300, blocks of which can be executed in an order different than that described herein and/or can be executed in combination with other processing, and/or by omitting certain processing described herein, can be executed by programming in a node 140 computer 155.

The process 300 begins in a block 305, in which the computer 155 receives sensor 145 data, e.g., image data 210 and/or LIDAR data 215. Further, the computer 155 could receive map data 205, e.g., from a remote computer 170, in the block 305, but also could receive the map data 205 outside of the process 300, e.g., by periodic download from the remote computer 170. Moreover, receipt of sensor 145 data in the computer 155 could be performed substantially continuously, or alternatively could be performed on a periodic basis, e.g., every five minutes, every hour, etc. Yet further, a message from a remote computer 170 or some other device via the network 135 could trigger or instruct the computer 155 to obtain sensor 145 data.

Next, the process 300 proceeds to a block 310. The block 310 could be executed on a programmatically determined periodic basis. For example, if sensor 145 data is being collected in the computer 155 substantially continuously as described above with respect to the block 305, the block 310 could be executed on a periodic basis selected to minimize use of computing resources and power consumption, but to evaluate sensor 145 data on a regular enough basis to provide data useful to vehicles 105 and/or the remote computer 170. In another example, data could be collected on a periodic basis as described above with respect to the block 305, whereupon the process 300 would proceed to the block 310 once a prescribed data collection period had elapsed.

In any event, in the block 310, the computer 155 executes programming for the image classifier 220, LIDAR analyzer 225, and data fuser 230 to generate a set of identified features 165*i*, as described above.

Next, in the decision block 315, the computer 155 determines whether it has received any vehicle state data 240, and/or data 240 providing a set of one or more features 165 for one or more infrastructure elements 160, as described above. If not, the process 300 proceeds to a block 345. Otherwise, the process 300 proceeds to a decision block 320.

In the decision block 320, the computer 155 determines whether the received vehicle data 240 includes vehicle 105 state data, as described above. The computer 155 typically also determines a number of vehicles 105 that have provided such state data, and is programmed to consider state data 240 only when received from a threshold number of vehicles within a predetermined time, e.g., 500 vehicles within one hour, 1000 vehicles within 1½ hours, etc. The computer 110 can aggregate state data 240, e.g., average suspension displacement data to determine an average displacement that can then be used to indicate a feature 165 such as a pothole or a damaged or degraded road 160*a*, or report a feature 165 such as slipperiness or low road friction, only if a threshold percentage, e.g., 75% 90%, etc., of vehicles 105 providing state data 240 report activation of one of an ABS or ESC. If received vehicle data includes vehicle 105 state data 240, and also typically if data 240 has been received from a sufficient number of vehicles, the process 300 proceeds to a block 325. Otherwise, feature 165 data has been received, the process 300 proceeds to a block 330.

In the block 325, the computer 155 applies the analyzer 245 to output vehicle identified features 165*v*, as described above.

In the block 330, the computer 155 determines whether data 240 has been received by which sensors 145 can be evaluated. For example, if vehicle data 240 included state data as determined in the block 320, but does not include features 165, then sensors 145 cannot be evaluated, and the process 300 proceeds to the block 345. Alternatively or additionally, the computer 155 could be programmed to evaluated sensors 145 only at a specified time or times of day, and if such time condition is not met, then similarly the process 300 could proceed to the block 345. However, if vehicle data 240 includes features 165 and the computer 155 is otherwise programmed to evaluate sensors 145, the process 300 proceeds to a block 335.

In the block 335, the computer 155 applies the comparator 255 discussed above to determine sensor 145 health. Then sensor health data 260 is output in a block 340. Further, the sensor health data 260 could be provided, e.g., via the network 135, to a remote computer 170. Yet further, the remote computer 170 could take action based on the received sensor health data 260, such as scheduling maintenance for the infrastructure node 140, transmitting a V2X message to vehicles 105 within a predetermined distance of the node 140 to ignore data provided from the node 140, etc.

The block 345 may be executed after any of the blocks 315, 330, 340. In the block 345, the computer 155 outputs infrastructure features 165 determined according to sensor 145 data and/or vehicle 105 data 240. The output can be stored in a memory or storage device associated with the computer 155. Further, the output can be provided to the remote computer 170, which may store features 165 from one or more nodes 140. Such features 165 can be in turn broadcast to other nodes 140 and/or provided to vehicles 105, e.g., if a first node 140 provides features 165 to the computer 170, the computer 170 can then provide the features 165 to one or more second nodes 140 on a same roadway as, and/or within a predetermined distance of, the first node 140. Yet further, a node 140 could provide output features 165 in a V2X communication to nearby vehicles 105.

Following the block 345, the process 300 ends.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Python, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
   a stationary support structure that is fixed at a geographic location; and
   sensors and a computer, each mounted to the stationary support structure;
   wherein the computer at the stationary support structure is programmed to receive data from a vehicle, and to determine one or more physical attributes of an infrastructure element based on the vehicle data; and
   wherein the vehicle data include one or more of:
   (a) the one or more physical attributes of the infrastructure element, or
   (b) data measuring vehicle operation.

2. The system of claim 1, wherein the computer is further programmed to determine a health of the sensors mounted to the stationary support structure based on the vehicle data.

3. The system of claim 2, wherein the computer is further programmed to transmit the health of the sensors mounted to the stationary support structure to a remote computer.

4. The system of claim 1, wherein the vehicle data measuring vehicle operation include at least one of vehicle suspension displacement, vehicle anti-lock brake system activation, and vehicle electronic stability control activation.

5. The system of claim 1, wherein the computer is further programmed to compare data from the sensors with the vehicle data to determine one or more physical attributes of the infrastructure element based on the vehicle data.

6. The system of claim 1, wherein the one or more physical attributes of the infrastructure element include at least one of a pothole, a crack, and a bump.

7. The system of claim 1, wherein the one or more physical attributes of an infrastructure element include a specification that the infrastructure element is one of normal, degraded, and damaged.

8. The system of claim 1, wherein the sensors include a LIDAR and a camera.

9. The system of claim 1, wherein the computer at the stationary support structure is programmed to receive data from a plurality of vehicles including the vehicle, and wherein the one or more physical attributes of the infrastructure element are determined based on the vehicle data including data from each of the plurality of vehicles.

10. A method, comprising:
    receiving, in a stationary support structure that is fixed at a geographic location, data from a vehicle; and
    determining one or more physical attributes of an infrastructure element based on the vehicle data received at the stationary support structure, wherein the vehicle data include one or more of:
    (a) the one or more physical attributes of the infrastructure element, or
    (b) data measuring vehicle operation.

11. The method of claim 10, further comprising determining a health of the sensors mounted to the stationary support structure based on the vehicle data.

12. The method of claim 11, further comprising transmitting a health of the sensors mounted to the stationary support structure to a remote computer.

13. The method of claim 10, wherein the vehicle data measuring vehicle operation include at least one of vehicle suspension displacement, vehicle anti-lock brake system activation, and vehicle electronic stability control activation.

14. The method of claim 10, further comprising comparing data from infrastructure sensors with the vehicle data to determine one or more physical attributes of the infrastructure element based on the vehicle data.

15. The method of claim 10, wherein the one or more physical attributes of the infrastructure element include at least one of a pothole, a crack, and a bump.

16. The method of claim 10, wherein the one or more physical attributes of an infrastructure element include a specification that the infrastructure element is one of normal, degraded, and damaged.

17. The method of claim 10, wherein the infrastructure element includes sensors that include a LIDAR and a camera.

18. A system, comprising:
    a stationary support structure that is fixed at a geographic location; and
    sensors and a computer, each mounted to the stationary support structure;
    wherein the computer at the stationary support structure is programmed to receive data from a vehicle, and to determine one or more physical attributes of an infrastructure element based on the vehicle data, and wherein the one or more physical attributes of the infrastructure element include at least one of (a) a pothole, (b) a crack, (c) a bump, or (d) a specification that the infrastructure element is one of normal, degraded, or damaged.

19. The system of claim 18, wherein the vehicle data includes the one or more physical attributes of the infrastructure element.

20. The system of claim 18, wherein the vehicle data used to determine the one or more physical attributes of the infrastructure element further include data measuring vehicle operation.

21. The system of claim 18, wherein the vehicle data includes the one or more physical attributes of the infrastructure element, and the computer is further programmed to compare data from the sensors with the vehicle data to determine one or more physical attributes of the infrastructure element based on the vehicle data.

22. The system of claim 18, wherein the vehicle data includes the one or more physical attributes of the infrastructure element, and the computer is further programmed to determine a health of the sensors mounted to the stationary support structure based on the vehicle data.

* * * * *